United States Patent
Sandhu et al.

(10) Patent No.: US 9,100,717 B2
(45) Date of Patent: Aug. 4, 2015

(54) METHODS AND SYSTEMS FOR FILE BASED CONTENT VERIFICATION USING MULTICORE ARCHITECTURE

(71) Applicant: Interra Systems, Inc., Cupertino, CA (US)

(72) Inventors: Ramandeep Singh Sandhu, Delhi (IN); Kulbhushan, Ghaziabad (IN); Manik Gupta, Delhi (IN)

(73) Assignee: Interra Systems Inc., Cupertino, CA (US)

( * ) Notice: Subject to any disclaimer, the term of this patent is extended or adjusted under 35 U.S.C. 154(b) by 164 days.

(21) Appl. No.: 14/049,919

(22) Filed: Oct. 9, 2013

(65) Prior Publication Data

US 2015/0098022 A1  Apr. 9, 2015

(51) Int. Cl.
*H04H 20/14* (2008.01)
*H04N 21/80* (2011.01)
*G06F 9/38* (2006.01)

(52) U.S. Cl.
CPC ............ *H04N 21/80* (2013.01); *G06F 9/3851* (2013.01)

(58) Field of Classification Search
USPC .............................................. 725/22
See application file for complete search history.

(56) References Cited

U.S. PATENT DOCUMENTS

| | | | |
|---|---|---|---|
| 2007/0157224 A1* | 7/2007 | Pouliot et al. | 725/22 |
| 2009/0241142 A1* | 9/2009 | Schuster et al. | 725/32 |
| 2010/0257413 A1* | 10/2010 | Brunet et al. | 714/57 |

* cited by examiner

*Primary Examiner* — Mulugeta Mengesha
(74) *Attorney, Agent, or Firm* — Benjamin A. Balser; Balser & Grell IP Law (57) ABSTRACT

The disclosed embodiments relates to methods and systems for performing a content verification in a video content. The method includes identification of one or more random access points in the video content. Thereafter, one or more work units are created based on the identified one or more random access points. The method further includes processing of the one or more work units by one or more processing units simultaneously, and determining one or more errors in each of the one or more work units while the decoding. The one or more determined errors in each of processed one or more work units are then merged with each other. A verification report is generated based on at least the merging.

18 Claims, 6 Drawing Sheets

METHODS AND SYSTEMS FOR FILE BASED CONTENT VERIFICATION USING MULTICORE ARCHITECTURE

TECHNICAL FIELD

The presently disclosed embodiments are related to verification of media content. More particularly, the presently disclosed embodiments are related to methods and systems for verification in fixed size media content or dynamically generated media content.

BACKGROUND

Today, media content is used in a variety of applications. The examples of the media content can be both audio and video contents. There are certain features associated with the production and broadcasting of the media content. Currently, due to the use of new technologies, evolving industry standards and the use of open architecture in the development of the media content, verification of the features associated with the production and broadcasting of the media content is essential for ensuring a quality broadcasting of the media content. As a result, the media content developers, providers, broadcasters and operators need to carry out quality checks to verify the media content.

The media content developers, providers, broadcasters and operators apply various media content verification methods known in the art on the media content. However, such methods are generally limited in their performance since the quantity of the media content is generally very large and is to be verified for quality checks 24*7, however the content verification occurs on a single core which makes the verification process considerably slow as it takes a substantial amount of time for verification due to presence of large quantity of media content.

In order to address this problem of slowness in verification process, media content verification methods have been developed in which at least the portion of the verification process is performed on the multiple cores. One of the known methods for verifying the media content is a slice-based method. In the slice-based method, a frame of a plurality of frames of the media content is broken into multiple slices. The parsing of each of the multiple slices of the frame of the plurality of frames of the media content is performed on a single core; however the decoding of each of the multiple slices of the frame of the plurality of frames of the media content is performed simultaneously on different cores. The slice-based method is limited by the factor that the improvement in the performance of the verification process is dependent on the number of slices. Thus, the gain (dependent on the performance) is not able to increase linearly with respect to the number of cores. Another limitation is that the slice-based method is only applicable to the media content having selected video formats (e.g. MPEG-2, H.264) and not all the existing video formats.

Another known method for verifying the media content is an alternate parse decode method. In the alternate parse-decode method, the parsing of a current frame of the media content, and the decoding of a preceding frame of the current frame of the media content occurs simultaneously on the different cores. The alternate parse decode method is limited by the fact that it cannot scale beyond the two cores.

It has also been found out that in both the slice-based method and the alternate parse-decode method, the scaling is limited and applicable only for decoding of the plurality of frames of the media content while the video quality analysis of the media content occurs only in the single core. Based on the above, there is need for common methods and systems that will efficiently verify the media content with various formats.

SUMMARY

According to the embodiments illustrated herein, there is provided a computer-implemented method for performing verification on a video content. The video content is either a fixed size video content or a dynamically generated video content, and is of any known video format. The video content includes one or more video segments, and each of the one or more video segments further include one or more video frames. The computer-implemented method includes identifying one or more random access points in the video content on a first thread of execution. Each of the one or more random access points corresponds to a first video frame of one of the one or more video segments. The computer-implemented method further includes creating one or more work units on the first thread of execution based on the identified one or more random access points. Each of the one or more created work units corresponds to the one or more video segments. The computer-implemented method further includes processing the one or more work units by one or more processing units on one or more threads of execution. Each of the one or more work units is automatically assigned to a free processing unit of the one or more processing units, and each of the one or more threads executes concurrently with respect to each other and the first thread. The computer-implemented method further includes determining one or more errors in each of the one or more work units during the processing of the one or more work units. In one embodiment, the determination of the one or more errors in one of the one or more work units being processed is facilitated by analyzing the one or more video frames in the one of the one or more work units. Also, the determination of the one or more errors in the one of the one or more work units being processed is facilitated by analyzing the one or more video frames in a succeeding work unit of the one of the one or more work units. Each of the one or more errors is represented by its corresponding state information that includes at least one of a type and description of error, a work unit identifier, a start location, and an end location. The computer-implemented method further includes merging the determined one or more errors in each of processed one or more work units with each other based on at least the state information of each of the one or more errors. Lastly, a verification report is generated based on the merging.

According to the embodiments illustrated herein, there is provided a computer-implemented method for performing verification on a media content. The media content is either a fixed size media content or a dynamically generated media content. The computer-implemented method includes receiving the media content on a first thread of execution. The media content includes a video content, and an audio content. The video content includes one or more video segments, and each of the one or more video segments includes one or more video frames. The computer-implemented method further includes demultiplexing of the media content into the video content and the audio content on the first thread of execution. The computer-implemented method further includes loading the video content and the audio content into a video buffer and an audio buffer respectively. The loading occurs continuously until the video buffer and the audio buffer are full, or the video content and the audio content is over, and on the first thread of execution. The computer-implemented method further includes processing the audio content by at least one processing unit on a second thread of execution. The at least one processing unit reads the audio content from the audio buffer. The computer-implemented method further includes identifying one or more random access points in the video content on a third thread of execution. Each of the one or more random access points corresponds to a first video frame of one of the one or more video segments. The computer-implemented method further includes creating one or more work units on the third thread of execution based on the identified one or more random access points. Each of the one or more created work units corresponds to the one or more video segments. The computer-implemented method further includes processing the one or more work units by one or more processing units on one or more threads of execution. Each of the one or more work units is automatically assigned to a free processing unit of the one or more processing units. In addition, each of the one or more threads executes concurrently with respect to each other, and the first thread/second thread/third thread. The computer-implemented method further includes determining one or more errors in each of the one or more work units during the processing of the one or more work units. The determination of the one or more errors in one of the one or more work units being processed is facilitated by analyzing the one or more video frames in the one of the one or more work units. Also, the determination of the one or more errors in the one of the one or more work units being processed is facilitated by analyzing the one or more video frames in a succeeding work unit of the one of the one or more work units. Each of the one or more errors is represented by its corresponding state information that includes at least one of a type and description of error, a work unit identifier, a start location, and an end location. The computer-implemented method further includes merging the determined one or more errors in each of processed one or more work units with each other based on at least the state information of each of the one or more errors. The merging further includes combining the one or more errors beginning at one of one or more video frames of one of the processed one or more work units with the one or more errors continuing at least at a first video frame of one or more video frames of a succeeding work unit of the one of the processed one or more work units. Lastly, a verification report is generated based on the merging.

According to the embodiments illustrated herein, there is provided a system for performing verification on a video content. The video content is either a fixed size video content or a dynamically generated video content. The video content includes one or more video segments. Each of the one or more video segments includes one or more video frames. The system includes a RAP module, a work unit creation module, a processing module, a merging module, and a report generation module. The RAP module is configured for identifying one or more random access points in the video content on a first thread of execution. Each of the one or more random access points corresponds to a first video frame of one of the one or more video segments. The work unit creation module is configured for creating one or more work units on the first thread of execution based on the identified one or more random access points. Each of the one or more created work units corresponds to the one or more video segments. The processing module is configured for decoding the one or more work units by one or more processing units on one or more threads of execution. Each of the one or more work units is automatically assigned to a free processing unit of the one or more processing units, and wherein each of the one or more threads executes concurrently with respect to each other and the first thread. The processing module is further configured for determining one or more errors in each of the one or more work units during the processing of the one or more work units. The determination of the one or more errors in one of the one or more work units being processed is facilitated by analyzing the one or more video frames in the one of the one or more work units. Also, the determination of the one or more errors in the one of the one or more work units being processed is facilitated by analyzing the one or more video frames in a succeeding work unit of the one of the one or more work units. Each of the one or more errors is represented by its corresponding state information that includes at least one of a type and description of error, a work unit identifier, a start location, and an end location. The merging module is configured for merging the determined one or more errors in each of processed one or more work units with each other based on at least the state information of each of the one or more errors. The report generation module is configured for generating a verification report based on the merging.

According to the embodiments illustrated herein, there is provided a system for performing verification on media content. The media content is either a fixed size media content or a dynamically generated media content. The system includes a communication unit, a demultiplexing module, a loading module, an audio processing module, a RAP module, a work unit creation module, a video processing module, a merging module, and a report generation module. The communication unit is configured for receiving the media content on a first thread of execution. The media content includes at least a video content, and an audio content. The video content includes one or more video segments, and each of the one or more video segments includes one or more video frames. The demultiplexing module is configured for demultiplexing the media content into the video content and the audio content on the first thread of execution. The loading module is configured for loading the video content and the audio content into a video buffer and an audio buffer respectively, wherein the loading occurs continuously until the video buffer and the audio buffer are full, or the video content and the audio content is over, and on the first thread of execution. The audio processing module is configured for processing the audio content by at least one processing unit on a second thread of execution, wherein the at least one processing unit reads the audio content from the audio buffer. The RAP module is configured for identifying one or more random access points in the video content on a third thread of execution, wherein each of the one or more random access points corresponds to a first video frame of one of the one or more video segments, and wherein the video content includes any video format. The work unit creation module is configured for creating one or more work units on the third thread of execution based on the identified one or more random access points, wherein each of the one or more created work units corresponds to the one or more video segments. The video processing module is configured for processing the one or more work units by one or more processing units on one or more threads of execution. Each of the one or more work units is then automatically assigned to a free processing unit of the one or more processing units, and wherein each of the one or more threads executes concurrently with respect to each other, the first thread, the second thread, and the third thread. The video processing module is further configured for determining one or more errors in each of the one or more work units during the processing of the one or more work units, wherein each of the one or more errors is represented by its corresponding state information that includes at least one of a type and description of error, a work unit identifier, a start location, and an end location. The determination of the one or more errors in one of the one or more work units being processed is facilitated by analyzing the one or more video frames in the one of the one or more work units. Also, the determination of the one or more errors in the one of the one or more work units being processed is facilitated by analyzing the one or more video frames in a succeeding work unit of the one of the one or more work units. The merging module is configured for merging the determined one or more errors in each of processed one or more work units with each other based on at least the state information of each of the one or more errors. The merging further includes combining the one or more errors beginning at one of one or more video frames of one of the processed one or more work units with the one or more errors continuing at least at a first video frame of one or more video frames of a succeeding work unit of the one of the processed one or more work units. The report generation module is configured for generating a verification report based on the merging.

According to the embodiments illustrated herein, there is provided a computer program product for use with a computer. The computer program product including a computer-usable data carrier storing a computer-readable program code embodied therein. The computer-readable program code configured for performing a verification on a video content. The video content is either a fixed size video content or a dynamically generated video content. The video content includes one or more video segments. Each of the one or more video segments includes one or more video frames. The computer-readable program code includes program instruction means for identifying one or more random access points in the video content on a first thread of execution, wherein each of the one or more random access points corresponds to a first video frame of one of the one or more video segments, and wherein the video content includes any video format. The computer-readable program code further includes program instruction means for creating one or more work units on the first thread of execution based on the identified one or more random access points, wherein each of the one or more created work units corresponds to the one or more video segments. The computer-readable program code further includes program instruction means for processing the one or more work units by one or more processing units on one or more threads of execution. Each of the one or more work units is then automatically assigned to a free processing unit of the one or more processing units, and each of the one or more threads executes concurrently with respect to each other and the first thread. The computer-readable program code further includes program instruction means for determining one or more errors in each of the one or more work units during the processing of the one or more work units, wherein each of the one or more errors is represented by its corresponding state information that includes at least one of a type and description of error, a work unit identifier, a start location, and an end location. The determination of the one or more errors in one of the one or more work units being processed is facilitated by analyzing the one or more video frames in the one of the one or more work units. Also, the determination of the one or more errors in the one of the one or more work units being processed is facilitated by analyzing the one or more video frames in a succeeding work unit of the one of the one or more work units. The computer-readable program code further includes program instruction means for merging the determined one or more errors in each of processed one or more work units with each other based on at least the state information of each of the one or more errors. The computer-readable program code further includes program instruction means for generating a verification report based on the merged one or more errors.

BRIEF DESCRIPTION OF DRAWINGS

The accompanying drawings illustrate various embodiments of systems, methods, and embodiments of various other aspects of the invention. Any person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit, the scope in any manner, wherein like designations denote similar elements, and in which.

DETAILED DESCRIPTION

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes, as methods and systems may extend beyond the described embodiments. For example, the teachings presented and the needs of a particular application may yield multiple alternate and suitable approaches to implement functionality of any detail described herein. Therefore, any approach may extend beyond the particular implementation choices in the following embodiments described and shown.

References to "one embodiment", "an embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

In this description, the terms 'comprises,' 'comprising,' 'includes,' 'including,' or any other variation thereof, are intended to cover a non-exclusive inclusion, such that a process, article, system or apparatus that comprises a list of elements does not include only those elements, but may include other elements not expressly listed or inherent to such a process, article or apparatus.

The term 'another', as may be used in this document, is defined as at least a second or more.

DEFINITIONS

The following terms shall have, for the purposes of this application, the respective meaning set forth below.

A "network" refers to a medium that connects various computing devices, and application servers. Examples of a network include, but are not limited to, LAN, WLAN, MAN, WAN, and the Internet. Communication over the network may be performed in accordance with various communication protocols such as Transmission Control Protocol and Internet Protocol (TCP/IP), User Datagram Protocol (UDP), IEEE 802.11n communication protocols, or the like.

A "computing device" refers to a device with a processor/microcontroller and/or any other electronic component, or a device or a system that performs one or more operations according to one or more programming instructions. Examples of a computing device include, but are not limited to, a desktop computer, a laptop, a personal digital assistant (PDA), a tablet computer (e.g., iPad®, Samsung Galaxy Tab®), smartphone, or the like.

A "thread" is a way for a program to divide itself into two or more simultaneously running tasks. The thread is contained inside a process and different threads in the same process share same resources while different processes in the same multitasking system do not.

A "thread of execution" refers to the smallest sequence of programmed instructions that can be managed independently by a system.

Figure 1:
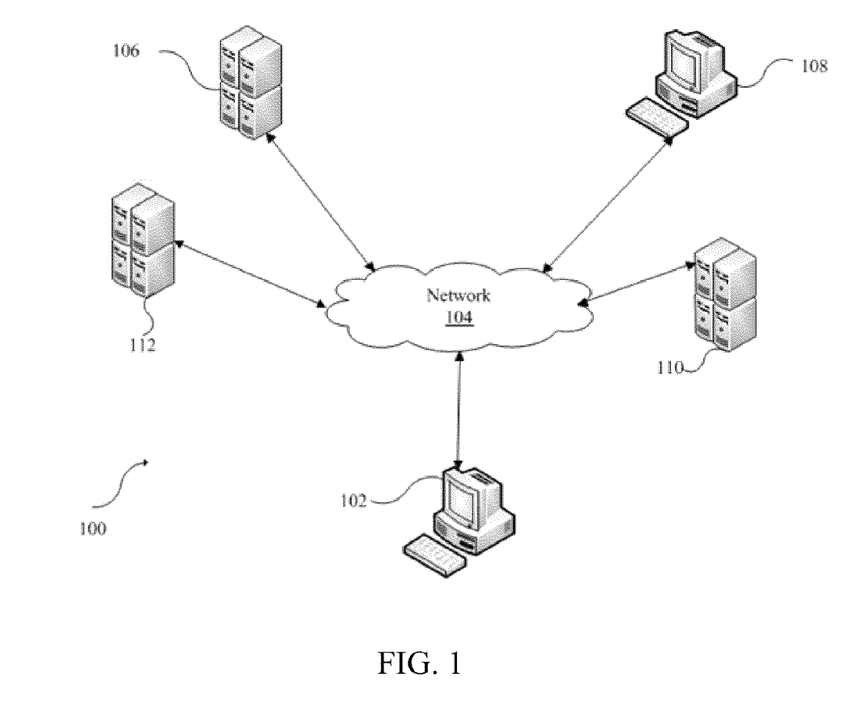
FIG. 1 is a block diagram illustrating a system environment for performing verification on a media content in accordance with various embodiments.

FIG. 1 is a block diagram illustrating a system environment 100 for performing verification on media content in accordance with various embodiments. The system environment 100 includes a first computing device 102, a network 104, a first application server 106, a second computing device 108, a second application server 110, and a third application server 112 respectively.

The FIG. 1 shows only one type of the first computing device 102 and the second computing device 108 (hereinafter refereed as the computing devices) for simplicity. It will be apparent to a person having ordinary skill in the art that the disclosed embodiments can be implemented for a variety of computing devices including, but not limited to, a desktop computer, a laptop, a personal digital assistant (PDA), a tablet computer (e.g., iPad®, Samsung Galaxy Tab®), or the like.

The computing devices include input device(s), such as keyboard, pointing device (e.g., mouse), pen, voice input device, touch input device, etc. The computing devices may also include output device(s), such as a display, speakers, printer, or the like. In an embodiment, the computing devices are configured to run an operating system software program and one or more software applications, which make up a system platform. In another embodiment, the computing devices include a software component that can be included as part of the operating system or can be included later as a software download.

The first application server 106, the second application server 110, and the third application server 112 (hereinafter refereed as the application servers) are devices that hosts one or more media contents and are interconnected to the computing devices over the network 104. Examples of the media content can be an audio content, a video content, a compressed media content, and an image content. In the present application, the media content is to be verified to detect errors, ensuring quality in compliance with various formats and technology standards. Examples of the technology standards include, but are not limited to, MPEG-2, MPEG-4, H.264, ProRES, DV Video, VC-1, and the like.

In another embodiment, the application servers host one or more applications/tools for managing the distribution of the one or more media contents to be verified. In this case, a requester accesses the application servers over the network 104 to submit the one or more media contents to be verified to detect errors, ensuring quality in compliance with various formats and technology standards. In an embodiment, the requester may be a media developer who produces the media content. The media developer may include, but are not limited to, a production house, a film studio, and an audio and video recording studio. In one embodiment of the present invention, the media developer includes only one production house, however, it will be apparent to a person with ordinary skill in the art that the media developer can include two or more production houses without moving out from the scope of the disclosed embodiments.

Interaction among the system components of the system environment 100 is described later in conjunction with FIG. 2.

Figure 2:
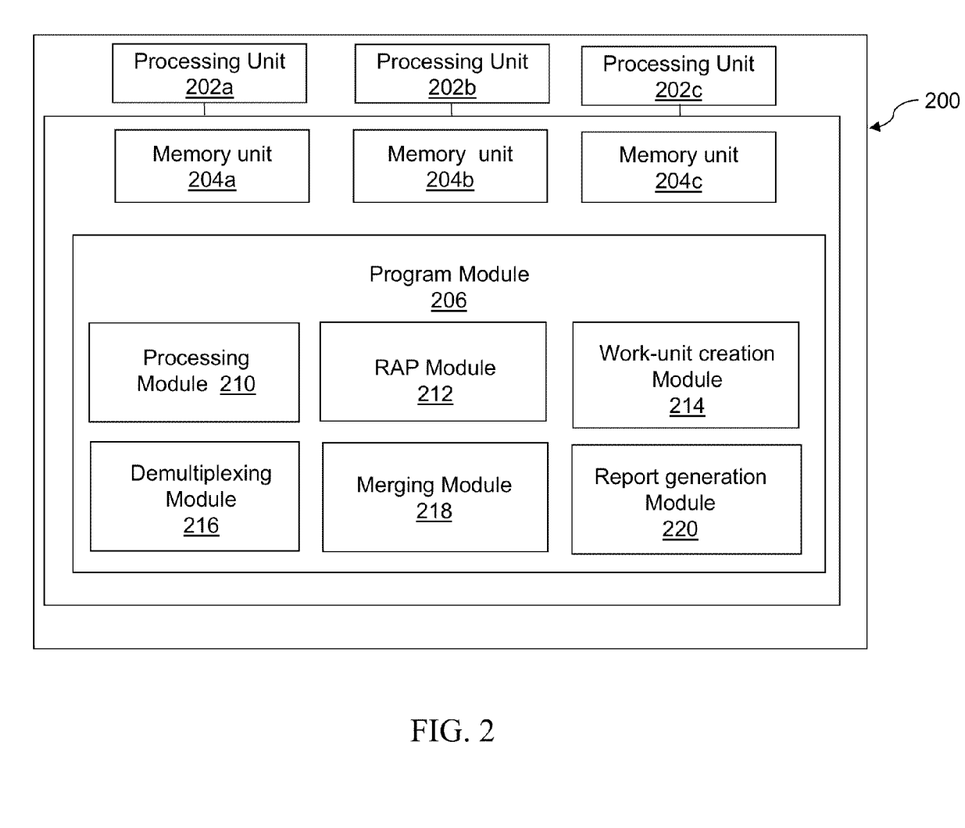
FIG. 2 is a block diagram illustrating a system for performing a verification on media content in accordance with various embodiments.

FIG. 2 is a block diagram illustrating a system 200 for performing verification on media content in accordance with various embodiments. In an example embodiment, the system 200 corresponds to a computing device such as, a Personal Digital Assistant (PDA), a Smartphone, a tablet PC, a laptop, a personal computer, a mobile phone, a Digital Living Network Alliance (DLNA)-enabled device, or the like. In another example embodiment, the system 200 may correspond to the first computing device 102, the second computing device 108, the first application server 106, the second application server 110, or the third application server 112.

The system 200 includes one or more processing units 202a, 202b, and 202c (hereinafter referred as the processing unit 202), and one or more memory's 204a, 204b, and 204c (hereinafter referred as the memory unit 204). The processing unit 202 is coupled with the memory unit 204. In one embodiment of the present application, the processing unit 202 is defined as a multi-core processing unit that includes three physical processing unit cores 202a, 202b, and 202c, or simply three cores, where each of the physical cores is available to process at least one application thread concurrently with at least one other physical core processing another thread. It will be apparent to a person with ordinary skill in the art that the processing unit 202 may include any number of processing unit cores depending on the performance considerations.

The processing unit 202 is configured to execute a set of instructions stored in the memory unit 204 to perform one or more operations. The processing unit 202 fetches the set of instructions from the memory unit 204 and executes the set of instructions. The processing unit 202 can be realized through a number of processing unit technologies known in the art. Examples of the processing unit include an X86 processing unit, a RISC processing unit, or any other suitable processing unit.

In another embodiment, a computer application configured to execute on the system 200 includes at least one process (or task), which is an executing program. Each process provides the resources to execute the program, and one or more threads run in the context of the process. According to the present invention, a thread of the one or more threads is generally a basic unit to which the operating system allocates time in the processing unit 202. Each thread of the one or more threads may include a scheduling priority, thread local storage, a thread identifier, and a thread context (or thread state) until the thread is scheduled. In parallel applications, the one or more threads are concurrently executed on the processing unit 202.

The memory unit 204 is configured to store the set of instructions or modules. Some of the commonly known memory implementations can be, but are not limited to, a random access memory (RAM), a read-only memory (ROM), a hard disk drive (HDD), and a secure digital (SD) card. The memory unit 204 includes a program module 206. The program module 206 includes a set of instructions that are executable by the processing unit 202 to perform specific actions for performing the verification on the media content. It is understood by a person with ordinary skill in the art that the set of instructions in conjunction with the various hardware of the system 200 enable the system 200 to perform various operations. The program module 206 includes a processing module 210, a RAP module 212, a work-unit creation module 214, a demultiplexing module 216, a merging module 218, a report generation module 220, a loading module (not shown in the FIG. 2), and a communication unit (not shown in FIG. 2)

In one embodiment, the memory unit 204 acts as a medium that stores the data submitted from and/or required by the processing module 210, the RAP module 212, the work-unit creation module 214, the demultiplexing module 216, the merging module 218, the report generation module 220, and the loading module for performing the verification on the media content.

In one embodiment, the media content is stored as a file in the memory unit 204. In another embodiment, the media content may be stored at a server. The server may be positioned at a remote location, or locally where the verification of the media content occurs. The file is extracted by various modules mentioned above from the memory unit 204 or the server for performing verification on the media content in accordance with various embodiments.

The communication unit is configured for receiving the media content. In one embodiment, the media content is a fixed size static content. In another embodiment, the media content is a dynamically generated media content. The dynamically generated media content corresponds to the media content that is being continually filled with new data. In one embodiment, the communication unit receives the media content on a first thread of execution. The processing unit 202a of the one or more processing units 202a, 202b, and 202c is utilized on the first thread of execution. The present invention will now be described with an example where the media contents are generally provided as video contents. It should however be realized that the present invention can be used for other types of media contents, like for instance music contents, image contents, MMS contents, audio-video contents or the like.

In the present application, the communication unit is configured to communicate the media content to the demultiplexing module 216. The demultiplexing module 216 facilitates the demultiplexing of the media content into a video content and an audio content on the first thread of execution. The audio content partially corresponds to the video content. In the present invention, any suitable known technique is used in order to de-multiplex the media content into the video content and the audio content without resulting in the quality degradation of a digital video data and a digital audio data in the video content and the audio content respectively.

In one example, the demultiplexing module 216 divides the media content into a number of divided data portions, one for each type of data within the media content, namely the video content (corresponding to the digital video data) and the audio content (corresponding to the digital audio data). Thereafter, the demultiplexing module 216 outputs each of these divided data portions to the loading module. The loading module then facilitates the loading of the video content (corresponding to the digital video data) and the audio content (corresponding to the digital audio data) into their respective buffers that is: an audio buffer and a video buffer. In an embodiment, the audio buffer is capable of storing 10 kilobytes ("kB") of Dolby Digital data or 8 kB of MPEG data, and the video buffer is capable of storing 500 kB of data. It is to be noted that the audio buffer and the video buffer may have any amount of space depending on the storage requirements without moving out from the scope of the disclosed embodiments. The loading of the video content and the audio content also occurs on the first thread of execution.

In the present invention, the loading of the video content and the audio content into the video buffer and the audio buffer respectively occurs continuously until the space in the video buffer and the audio buffer is full, or the video content and the audio content is over. In addition, the audio buffer and the video buffer are designed to be thread safe and are capable to handle multiple race conditions along with the read/write requests.

The audio content that is divided out from the media content and stored in the audio buffer may be encoded in a number of ways, such as MPEG, Dolby, PCM, etc., and may include the digital audio data for one or more audio channels, such as mono, stereo, five channel-surround sound, etc. The system 200 further includes the processing module 210 (herein configured to work as an audio processing module), to facilitate the processing (decoding) of the audio content using the appropriate decoding process. In an embodiment, the processing module 210 reads the audio content from the audio buffer, and then processes (decodes) the audio content on a second thread of execution. In the second thread of execution, the processing unit 202b of the one or more processing units 202a, 202b, and 202c processes (decodes) the audio content. The processed digital audio data is then converted into uncompressed form. In one embodiment, the second thread of execution on which the audio content is processed is different from the first thread of execution, but executes concurrently with respect to the first thread of execution. This implies that the first processing unit 202a and the second processing unit 202b are executing and processing simultaneously.

In the present application, the processing unit 202b may utilize various coding techniques for decoding of the audio content into pcm samples.

In an embodiment, the video content (digital video data) that is divided out from the media content and stored in the video buffer is encoded in a number of ways, such as MPEG-2, H264 etc. Thereafter, the system 200 utilizes the RAP module 212, and the work-unit creation module 214 that facilitates the simultaneous processing (decoding) of the video content.

The demultiplexing module 216 of the system 200 is further configured to determine a format of the video content. The demultiplexing module 216 thus facilitates the parsing of the video content in order to determine the format of the video content. Further, based on the determined format of the video content, the RAP module 212 then facilitates an analysis of the video content. In the present application, the video content being analyzed for determination of the one or more random access points includes one or more video segments. Each of the one or more video segments includes the one or more video frames described above. In an embodiment of the present application, the one or more random access points are determined independently for each format of the video content. It is to be noted that the determination of the one or more random access points in the video content is dependent on the format of the video content. In the following paragraphs, the determination of the one or more random access points in the video content is described for MPEG2 format, H.264 format, and other intracoded formats (such as ProRES, DNxHD, and MJPEG2K).

In one embodiment, the video content is of MPEG-2 video format. In this case, the one or more video segments are identified from the video content. Here, one or more GOPs (group of pictures) are combined to form a video segment. Further, each of the one or more video segments is indicated by the presence of a header, and comprises a flag. In one example, the flag for each of the one or more video segments is represented as closed_gop. If the one or more video segments comprise the flag, then the one or more video segments are considered as closed one or more video segments. If the one or more video segments do not comprise the flag, then the one or more video segments are considered as open one or more video segments.

In case of the closed one or more video segments, each video segment of the closed one or more video segments is an independent sub-sequence, and there is no previous dependency of any current video segment of the closed one or more video segments on any preceding video segment of the closed one or more video segments. Thus, the RAP module 212 is configured to identify the one or more video frames that are positioned at the ends of the video segments of the closed one or more video segments as the one or more random access points.

In case of the open one or more video segments, each video segment of the open one or more video segments is not an independent sub-sequence, and there is dependency of any current video segment of the open one or more video segments on any preceding video segment of the open one or more video segments. In an embodiment, the dependencies can be handled by decoding one or video frames from a preceding video segment.

In another embodiment, the video content is of H.264 video format. Herein, the one or more random access points are identified by the RAP module 212 by facilitating an IDR (Instantaneous Decoder Refresh) technique. In the IDR technique, the one or more video frames are identified at which a decoder can be flushed and/or refreshed without any previous dependency.

In another embodiment, the RAP module 212 identifies the one or more random access points in the video content of the H.264 video format by facilitating a Recovery Point SEI Message technique. In the Recovery Point SEI Message technique, the RAP module 212 identifies the one or more video frames in which one or more messages are accompanied along with the one or more video frames at regular intervals as the one or more random access points.

In yet another embodiment, the video content is of intracoded formats (such as ProRES, DNxHD, and MJPEG2K). Herein, the video content comprises only I (Intra) video frames, and each of the one or more "I" video frames can be considered as the one or more random access points by the RAP module 212.

The RAP module 212 is further configured to identify one or more random access points in the video content on a third thread of execution. The processing unit 202c of the one or more processing units 202a, 202b, and 202c is utilized on the third thread of execution. In one embodiment, the third thread of execution is different from the first thread of execution and the second thread of execution, but executes concurrently with respect to the first thread of execution and the second thread of execution. This implies that the first processing unit 202a, the second processing unit 202b, and the third processing unit 202c are executing and processing simultaneously.

In one embodiment, each of the identified one or more random access points corresponds to a first video frame of the one or more video frames of one of the one or more video segments in the video content. The RAP module 212 is further configured to obtain one or more details corresponding to the one or more video frames of each of the one or more video segments in the video content. The one or more details may correspond to a start time code, a starting picture number, a start content offset, an end time code or the like.

The system 200 further includes the work-unit creation module 214 configured for creating one or more work units. The work-unit creation module 214 facilitates the creation of the one or more work units on the third thread of execution based on the identified one or more random access points by the RAP module 212. In one embodiment, two consecutive random access points of the one or more identified random access points are used to create a single work unit of the one or more work units. In another embodiment, any number of random access points of the one or more identified random access points may be combined to form the single work unit of the one or more work units. The one or more created work units correspond to the one or more video segments. In one embodiment, the one or more created work units are stored in a job queue by the work-unit creation module 214. As soon as the work-unit creation module 214 creates the one or more work units, they are pushed into the job queue. The processing module 210 (herein configured as a video processing module) then reads the one or more created work units from the job queue. The processing module 210 facilitates the processing of the one or more created work units. The processing of the one or more created work units corresponds to the decoding and subsequently the quality checking of the one or more created work units. While the processing of the one or more created work units, each of the one or more video frames present within the one or more created work units is decoded and an output (decoded one or more video frames) is generated in the form of YUVs. After the decoding, if there is any change in the values of each of the video frames present within the one or more created work units that are processed, then type and description of errors like resolution, framerate, chroma format, or the like are notified on each video frames and sent to the report generation module 220.

In one embodiment, the processing module 210 facilitates the processing of the one or more created work units on one or more threads of execution in order to have better distribution of workload to utilize all the available computing power. In an embodiment, each of the one or more work units present in the job queue are automatically assigned to a free processing unit of the one or more processing units 202a, 202b, and 202c. It will be apparent to a person with ordinary skill in the art that only three processing units are depicted in the one or more processing units 202a, 202b, and 202c for simplicity, but it may include any number of processing units depending on the performance considerations. It is to be further noted that the one or more created work units are parallely assigned to the one or more processing units 202a, 202b, and 202c depending on the format of the video data contained in the one or more created work units. In one embodiment, each of the one or more threads of execution is different from the first thread of execution, the second thread of execution, and the third thread of execution, but executes concurrently with respect to each other, the first thread of execution, the second thread of execution, and the third thread of execution.

The processing module 210 is further configured for determining one or more errors in each of the one or more work units being processed. In one embodiment, the determination of the one or more errors in one of the one or more work units being processed is facilitated by analyzing the one or more video frames in the one of the one or more work units. Also, the determination of the one or more errors in the one of the one or more work units being processed is also facilitated by analyzing the one or more video frames in a succeeding work unit of the one of the one or more work units. It is to be noted that each of the one or more determined errors is represented by its corresponding state information that comprises at least one of a type and description of error, a work unit identifier, a start location, and an end location. The type and description of errors may include resolution, contrast, framerate, chroma format, or the like.

Figure 3:
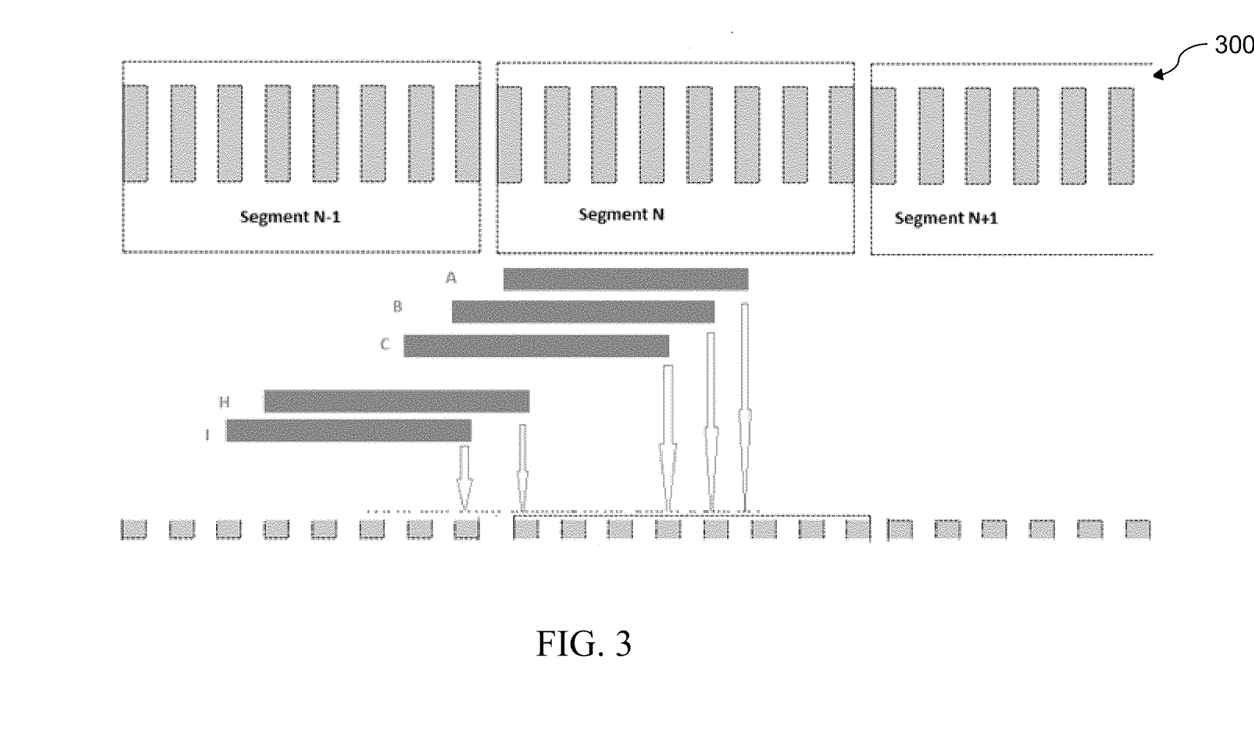
FIG. 3 is a block diagram illustrating determination of one or more errors in one of processed one or more work units in accordance with various embodiments.

FIG. 3 is a block diagram 300 illustrating determination of the one or more errors in one of the one or more work units being processed in accordance with various embodiments. As embodied and shown in FIG. 3, there are three work units being processed, namely, work unit (N−1), work unit (N), and work unit (N+1). It is shown that there are errors A, B, C, H, and I in the work unit (N−1), the work unit (N), and the work unit (N+1). For the determination of errors A, the processing module 210 will facilitate the analysis of the one or more video frames in the work unit (N). Similarly, for the determination of errors I, the processing module 210 will facilitate the analysis of the one or more video frames in the work unit (N−1). However, for the determination of the errors B, C, and H, the processing module 210 will facilitate the analysis of the one or more video frames in the work unit (N−1) as well as the one or more video frames in the work unit (N). It is to be noted that if an error is found at the boundary of the work unit (N−1) being executed at a processing unit X, then the processing module 210 will also facilitate the analysis of the one or more video frames in the succeeding work unit (N) being executed at a processing unit Y while analyzing the work unit (N−1) at the processing unit X in order to detect the errors.

Referring back to FIG. 2, the merging module 218, post the determination and identification of the one or more errors, then facilitates the merging of the determined one or more errors from each of processed one or more work units with each other based on the state information of each of the one or more errors. In an embodiment, the merging module 218 merges the determined one or more errors of similar type. Also, the merging module 218 combines the one or more errors beginning at one of one or more video frames of one of the processed one or more work units with the one or more errors continuing at least at a first video frame of one or more video frames of a succeeding work unit of the one of the processed one or more work units. The merging module 218 then stores the merged one or more errors from each of the processed one or more work units.

Figure 4:
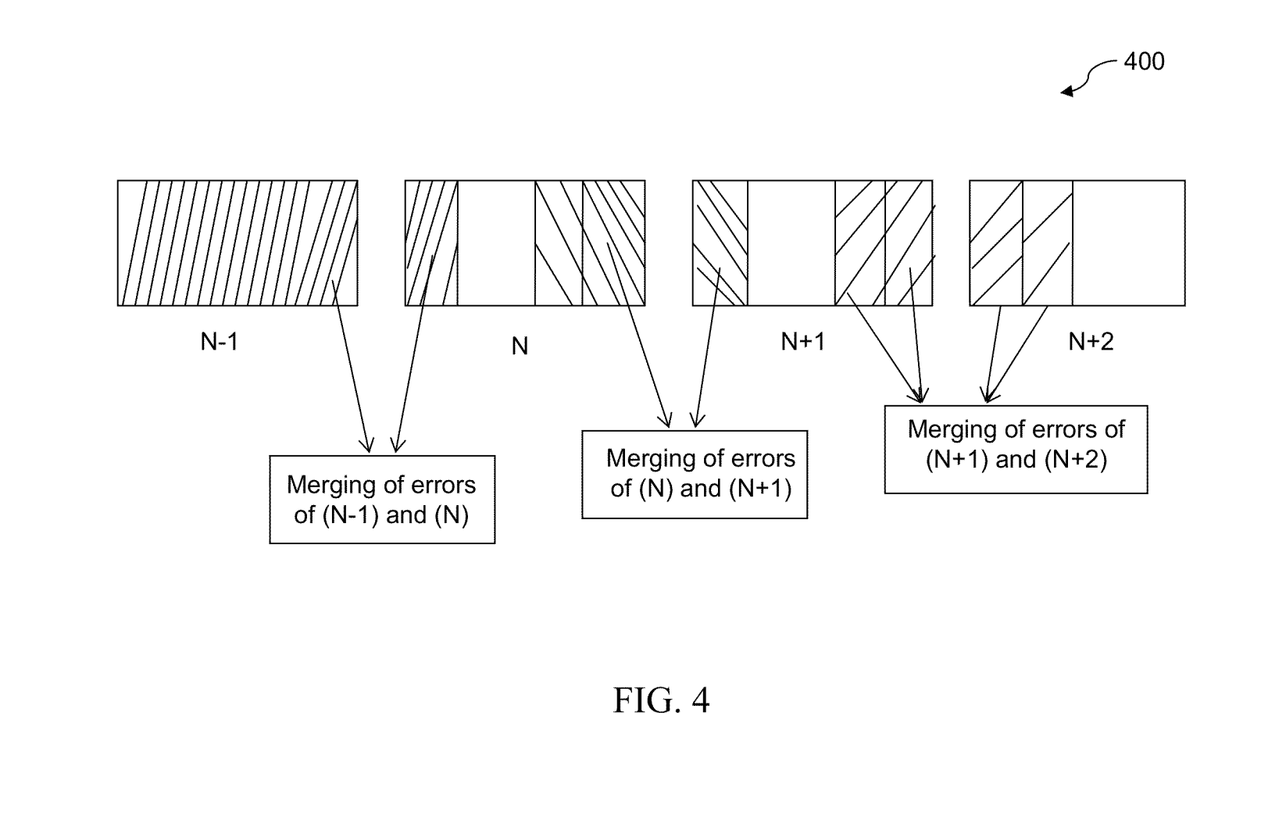
FIG. 4 is a block diagram illustrating merging of one or more errors in each of processed one or more work units in accordance with various embodiments.

The merging of the determined error sequence from each of the processed one or more work units with each other will now be explained in conjunction with FIG. 4. FIG. 4 is a block diagram 400 illustrating merging of one or more errors in each of processed one or more work units in accordance with various embodiments. As embodied and shown in FIG. 4, there are four processed work units, namely, work unit (N−1), work unit (N), work unit (N+1), and work unit (N+2). In the work unit (N−1), a first error is found from a first video frame till a last video frame. In the work unit (N), the first error is found in a first video frame and a second error is found in last two video frames. In the work unit (N+1), the second error is found in a first video frame and a third error is found in last two video frames. Lastly, in the work unit (N+2), the third error is found in a first two video frames. The merging module 218 combines the first error till the last video frame of the work unit (N−1) with the first error at the first video frame of the succeeding work unit (N+1). The merging module 218 further combines the second error present in the last two video frames of the work unit (N) with the second error in the first video frame of the succeeding work unit (N+1). The merging module 218 further combines the third error in the last two video frames of the work unit (N+1) with the third error present in the first two video frames of the succeeding work unit (N+2).

Referring back to FIG. 2, the system 200 further includes the report generation module 220 configured for generating a verification report based on at least the merging and all the one or more errors that are found within the media content. The report generation module 220 is also configured to incrementally report the determined one or more errors to the requester or the user.

Figure 5:
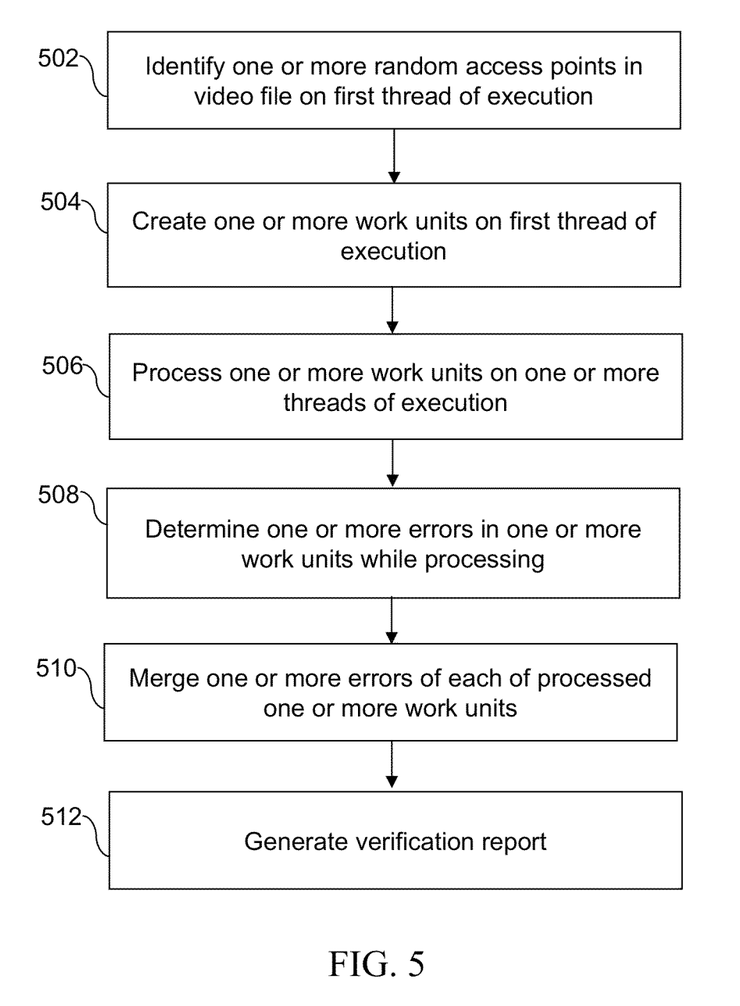
FIG. 5 is a flow diagram illustrating a method for performing verification on a video content in accordance with at least one embodiment.

FIG. 5 is a flow diagram illustrating for performing verification in a video content in accordance with at least one embodiment. FIG. 5 will be explained in conjunction with FIG. 1-2.

At step 502, one or more random access points are identified in the video content on a third thread of execution. In an embodiment, the one or more random access points are identified by a RAP module 212. Firstly, the RAP module 212 is configured to determine a format of the video content by the parsing of the video content. Based on the determined format of the video content, the RAP module 212 then facilitates the analysis of the video content to identify the one or more random access points in the video content. In an embodiment of the present application, the one or more random access points are determined independent of a format of the video content.

In an embodiment, each of the identified one or more random access points corresponds to a first video frame of one or more video frames of one of one or more video segments in the video content. In an embodiment, the RAP module 212 also obtains one or more details corresponding to the one or more frames of each of the one or more video segments in the video content. The one or more details may correspond to a start time code, a starting picture number, a start content offset, an end time code or the like.

At step 504, one or more work units are created on the third thread of execution. In an embodiment, the one or more work units are created by a work-unit creation module 214. In an embodiment, the work-unit creation module 214 facilitates the creation of the one or more work units on the third thread of execution based on the identified one or more random access points by the RAP module 212. In one embodiment, two consecutive random access points of the one or more identified random access points are used to create a single work unit of the one or more work units.

At step 506, one or more created work units are processed on one or more thread of execution. In an embodiment, the processing of the one or more created work units by one or more processing units 202 is facilitated by the processing module 210 (herein working as a video processing module). In an embodiment, the processing module 210 facilitates the processing (decoding) of the one or more created work units on the one or more threads of execution. In an embodiment, each of the one or more work units present in the job queue is automatically assigned to a free video processing unit of the one or more processing units 202.

At step 508, one or more errors are determined in the one or more work units. In an embodiment, the one or more errors are determined in the one or more work units during the processing by the processing module 210. In an embodiment, each of the one or more errors is represented by its corresponding state information that comprises at least one of a type and description of error, a work unit identifier, a start location, and an end location.

At step 510, the one or more determined errors of each of processed one or more work units are merged. In an embodiment, the merging of the determined one or more errors in each of the processed one or more work units with each other is facilitated by the merging module 218 based on the state information of each of the one or more errors. The merging also includes combining the one or more errors beginning at one of one or more video frames of one of the processed one or more work units with the one or more errors continuing at least at a first video frame of one or more video frames of a succeeding work unit of the one of the processed one or more work units.

At step 512, a verification report is generated. In an embodiment, the verification report is generated by a report generation module 220 based on the merging. The report generation module 220 is also configured to incrementally report the determined one or more errors in each of the one or more work units to the user.

Figure 6:
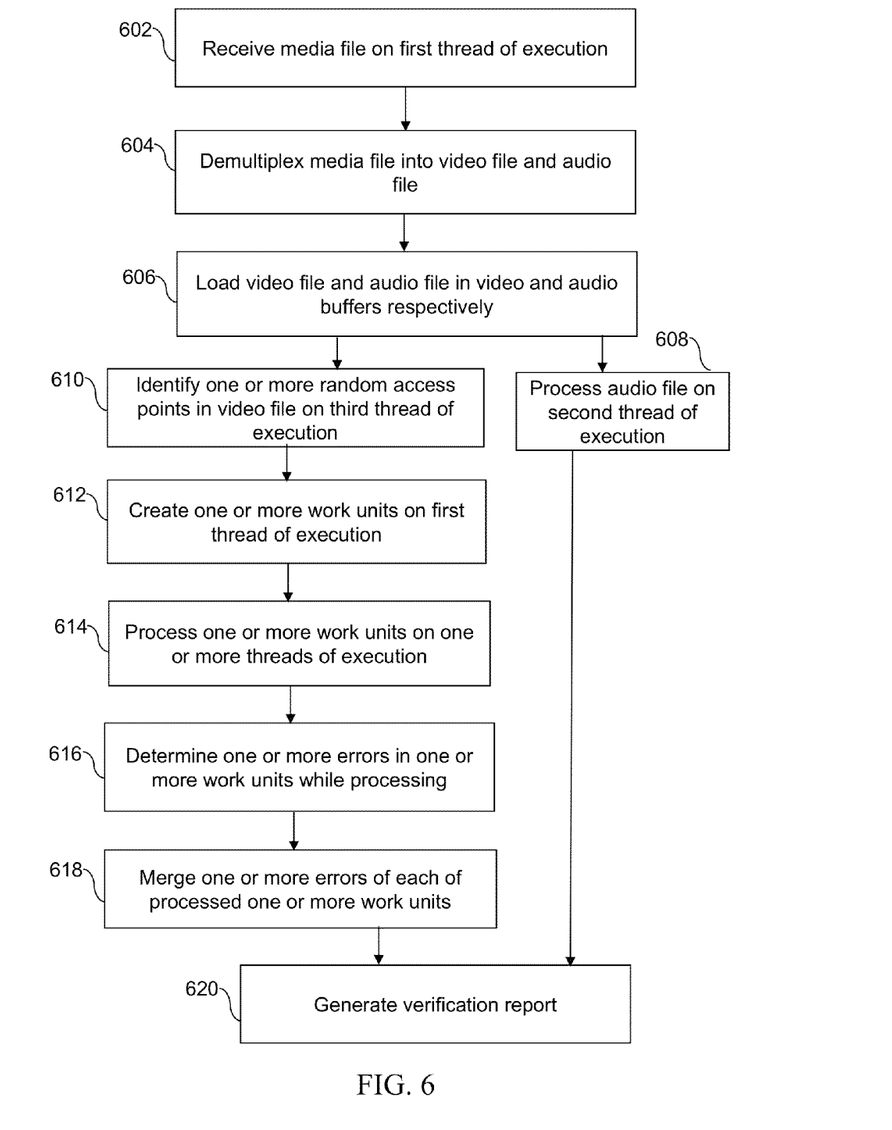
FIG. 6 is a flow diagram illustrating a method for performing verification on a media content in accordance with at least one embodiment.

FIG. 6 is a flow diagram illustrating a method for performing verification in a media content in accordance with at least one embodiment. FIG. 6 will be explained in conjunction with FIG. 1-2.

At step 602, the media content is received on a first thread of execution. In an embodiment, the media content is received by a communication unit. In one example, the media content is a fixed size static content. In another example, the media content is a dynamically generated media content. The dynamically generated media content corresponds to the media content that is being continually filled with new data.

At step 604, the media content is demultiplexed. In an embodiment, the communication unit communicates the media content to a demultiplexing module 216. The demultiplexing module 216 divides the media content into a number of divided data portions, one for each type of data within the media content, namely a video content (corresponding to a digital video data) and an audio content (corresponding to a digital audio data).

At step 606, the video content and the audio content are loaded onto a video buffer and an audio buffer. In an embodiment, the demultiplexing module 216 outputs each of the divided data portions (the audio content and the video content) to a loading module. The loading module then facilitates the loading of the audio content and the video content to their respective buffers: the audio buffer, and the video buffer respectively. In one embodiment, the loading of the video content and the audio content onto the video buffer and the audio buffer occurs on the first thread of execution.

At step 608, the audio content is processed on a second thread of execution. In an embodiment, the audio content stored in the audio buffer is encoded in a number of ways, and may include the digital audio data for one or more audio channels. A processing module 210 (herein working as an audio processing module) facilitate the decoding of the audio content using the appropriate decoding process. In one embodiment, the processing module 210 (herein working as an audio processing module) reads the audio content from the audio buffer, and decodes the audio content on the second thread of execution. The second thread of execution is different from the first thread of execution but executes concurrently with respect to the first thread of execution.

At step 610, one or more random access points are identified in the video content on a third thread of execution. In an embodiment, one or more random access points are identified by a RAP module 212. Firstly, the processing module 210 is configured to determine a format of the video content by the parsing of the video content.

Further, based on the determined format of the video content, the RAP module 212 then facilitates the analysis of the video content to identify the one or more random access points in the video content on the third thread of execution. The third thread of execution is different from the first thread of execution, and the second thread of execution, but executes concurrently with respect to the first thread of execution and the second thread of execution. The one or more random access points are determined independently for each format of the video content. It is to be noted that the determination of the one or more random access points in the video content is dependent on the format of the video content.

In an embodiment, one or more details corresponding to the one or more frames of each of the one or more video segments in the video content are also obtained by the RAP module 212. The one or more details may correspond to a start time code, a starting picture number, a start content offset, or the like.

At step 612, one or more work units are created on the third thread of execution. In an embodiment, the one or more work units are created by a work-unit creation module 214. In an embodiment, the work-unit creation module 214 facilitates the creation of the one or more work units on the third thread of execution based on the identified one or more random access points by the RAP module 212. In one embodiment, two consecutive random access points of the one or more identified random access points are used to create a single work unit of the one or more work units. In another embodiment, any number of random access points of the one or more identified random access points may be combined to form the single work unit of the one or more work units. The one or more created work units corresponds to the one or more video segments.

In an embodiment, the one or more created work units are stored in a job queue. As soon as the one or more work units are created, they are pushed into the job queue.

At step 614, the one or more created work units are processed on one or more threads of execution. In an embodiment, the processing of the one or more created work units by the one or more processing units 202 is facilitated by the processing module 210 (herein working as a video processing module). In an embodiment, the processing module 210 facilitates the processing (that is, the decoding and subsequently quality checking) of the one or more created work units on one or more threads of execution. While the processing of the one or more created work units, each of the one or more video frames present within the one or more created work units is decoded and an output (decoded one or more video frames) is generated in the form of YUVs. After the decoding, if there is any change in the values of each of the video frames present within the one or more created work units that are processed, then errors like resolution, framerate, chroma format, or the like are notified on each video frames and sent to the report generation module 220.

In an embodiment, each of the one or more work units present in the job queue is automatically assigned to a free processing unit of the one or more processing units. Further, each of the one or more threads of execution is different from the first thread of execution, the second thread of execution, and the third thread of execution, and executes concurrently with respect to each other, the first thread of execution, the second thread of execution, and the third thread of execution.

At step 616, one or more errors are determined in the one or more work units. In an embodiment, the one or more errors are determined in the one or more work units during the processing by the processing module 210. In one embodiment, the determination of the one or more errors in one of the one or more work units being processed is facilitated by analyzing the one or more video frames in the one of the one or more work units. Also, the determination of the one or more errors in the one of the one or more work units being processed is also facilitated by analyzing the one or more video frames in a succeeding work unit of the one of the one or more work units. Further, each of the one or more errors is represented by its corresponding state information that comprises at least one of a type and description of error, a work unit identifier, a start location, and an end location.

At step 618, the one or more determined errors in each of the one or more processed work units are merged. In an embodiment, the merging of the determined one or more errors in each of the processed one or more work units with each other is facilitated by the merging module 218 based on the state information of each of the one or more errors. The merging also includes combining the one or more errors beginning at one of one or more video frames of one of the processed one or more work units with the one or more errors continuing at least at a first video frame of one or more video frames of a succeeding work unit of the one of the processed one or more work units.

At step 620, a verification report is generated. In an embodiment, the verification report is generated by a report generation module 220 based on the merging. The report generation module 220 is also configured to incrementally report the determined one or more errors in each of the one or more work units to the user.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, etc. The storage device may also be a means for loading computer programs or other instructions into the computer system. The computer system also includes a communication unit. The communication unit allows the computer to connect to other databases and the Internet through an Input/output (I/O) interface, allowing the transfer as well as reception of data from other databases. The communication unit may include a modem, an Ethernet card, or other similar devices, which enable the computer system to connect to databases and networks, such as, LAN, MAN, WAN, and the Internet. The computer system facilitates inputs from a user through input device, accessible to the system through an I/O interface.

The computer system executes a set of instructions that are stored in one or more storage elements, in order to process input data. The storage elements may also hold data or other information, as desired. The storage element may be in the form of an information source or a physical memory element present in the processing machine.

The programmable or computer readable instructions may include various commands that instruct the processing machine to perform specific tasks such as, steps that constitute the method of the disclosure. The method and systems described can also be implemented using only software programming or using only hardware or by a varying combination of the two techniques. The disclosure is independent of the programming language and the operating system used in the computers. The instructions for the disclosure can be written in all programming languages including, but not limited to, 'C', 'C++', 'Visual C++' and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, results of previous processing, or a request made by another processing machine. The disclosure can also be implemented in all operating systems and platforms including, but not limited to, 'Unix', DOS', 'Android', 'Symbian', and 'Linux'

The programmable instructions can be stored and transmitted on a computer-readable medium. The disclosure can also be embodied in a computer program product comprising a computer-readable medium, or with any product capable of implementing the above methods and systems, or the numerous possible variations thereof.

The method, system, and computer program product for performing the content verification in the media content, as described above, have various advantages. The disclosed method and system enables higher scalability and superior performance gain. The disclosed method and system is also applicable to video contents of any available video format. In addition, the disclosed method and system provides better distribution of workload to efficiently utilize all the available computing power.

Various embodiments of the method and system for performing the content verification in the media content have been disclosed. However, it should be apparent to those skilled in the art that many more modifications, besides those described, are possible without departing from the inventive concepts herein. The embodiments, therefore, are not to be restricted, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create many other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, etc.

The claims can encompass embodiments for hardware, software, or a combination thereof.

It will be appreciated that variants of the above disclosed, and other features and functions or alternatives thereof, may be combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A computer implemented method for performing verification on a video content, the video content is either a fixed size video content or a dynamically generated video content, the video content comprising one or more video segments, each of the one or more video segments comprising one or more video frames, the computer implemented method comprising: identifying one or more random access points in the video content on a first thread of execution, wherein each of the one or more random access points corresponds to a first video frame of one of the one or more video segments, and wherein the video content comprises any video format; creating one or more work units on the first thread of execution based on the identified one or more random access points, wherein each of the one or more created work units corresponds to the one or more video segments; processing the one or more work units on one or more threads of execution, wherein the processing is performed by one or more processing units, wherein each of the one or more work units is automatically assigned to a free processing unit of the one or more processing units, and wherein each of the one or more threads executes concurrently with respect to each other and the first thread; determining one or more errors in each of the one or more work units during the processing of the one or more work units, wherein each of the one or more errors is represented by its corresponding state information that comprises at least one of a type and description of error, a work unit identifier, a start location, and an end location; merging the determined one or more errors in each of processed one or more work units with each other based on at least the state information of each of the one or more errors; and generating a verification report based on the merging.

2. The computer implemented method of claim 1 further comprising receiving a media content, wherein the media content comprises at least the video content and an audio content that at least partially correspond to the video content, and wherein the media content is either a fixed size media content or a dynamically generated media content.

3. The computer implemented method of claim 2 further comprising demultiplexing the media content into at least the audio content and the video content.

4. The computer implemented method of claim 2 further comprising determining format of the media content by parsing the media content.

5. The computer implemented method of claim 1, wherein the video content is of MPEG-2, MPEG-4, H.264, ProRES, DV Video, or VC-1 video format.

6. The computer implemented method of claim 1 further comprising obtaining one or more details corresponding to each of the one or more video segments in the video content, wherein the one or more details correspond to a start time code, a starting picture number, a start content offset and a end time code.

7. The computer implemented method of claim 1, wherein each of the one or more random access points corresponds to the first video frame of the one of the one or more video segments, starting from which, all remaining video frames in the one of the one or more video segments are processed independently of any video frame previous to the first video frame.

8. The computer implemented method of claim 1 further comprising reporting of the determined one or more errors in each of the processed one or more work units incrementally.

9. The computer implemented method of claim 1, wherein the dynamically generated video content corresponds to the video content that is at least being continually filled with new data.

10. The computer implemented method of claim 1, wherein the determination of the one or more errors in each of the one or more work units during the processing of the one or more work units is facilitated by analyzing at least the one or more video frames in the one of the one or more work units, and the one or more video frames in a succeeding work unit of the one of the one or more work units.

11. The computer implemented method of claim 1, wherein the merging comprises combining the one or more errors beginning at one of one or more video frames of one of the processed one or more work units with the one or more errors continuing at least at a first video frame of one or more video frames of a succeeding work unit of the one of the processed one or more work units.

12. A computer implemented method for performing verification on a media content, wherein the media content is either a fixed size media content or a dynamically generated media content, the computer implemented method comprising: receiving the media content on a first thread of execution, wherein the media content comprises at least a video content and an audio content that at least partially correspond to the video content, and wherein the video content comprises one or more video segments, and wherein each of the one or more video segments comprising one or more video frames; demultiplexing of the media content into the video content and the audio content on the first thread of execution; loading the video content and the audio content into a video buffer and an audio buffer respectively, wherein the loading occurs continuously until the video buffer and the audio buffer are full, or the video content and the audio content is over, and on the first thread of execution; processing the audio content by at least one processing unit on a second thread of execution, wherein the at least one processing unit reads the audio content from the audio buffer; identifying one or more random access points in the video content on a third thread of execution, wherein each of the one or more random access points corresponds to a first video frame of one of the one or more video segments, and wherein the video content comprises any video format; creating one or more work units on the third thread of execution based on the identified one or more random access points, wherein each of the one or more created work units corresponds to the one or more video segments; processing the one or more created work units on one or more threads of execution, wherein the processing is performed by the one or more processing units, wherein each of the created one or more work units is automatically assigned to a free processing unit of one or more processing units, and wherein each of the one or more threads executes concurrently with respect to each other, the first thread, the second thread, and the third thread; and determining one or more errors in each of the one or more work units during the processing of the one or more work units, wherein the determination of the one or more errors in one of the one or more work units is facilitated by analyzing at least the one or more video frames in the one of the one or more work units, and the one or more video frames in a succeeding work unit of the one of the one or more work units, and wherein each of the one or more errors is represented by its corresponding state information that comprises at least one of a type and description of error, a work unit identifier, a start location, and an end location; merging the determined one or more errors in each of processed one or more work units with each other based on at least the state information of each of the one or more errors, wherein the merging further comprises combining the one or more errors beginning at one of one or more video frames of one of the processed one or more work units with the one or more errors continuing at least at a first video frame of one or more video frames of a succeeding work unit of the one of the processed one or more work units; and generating a verification report based on the merging.

13. A system for performing verification on a video content, wherein the video content is either a fixed size video content or a dynamically generated video content, the video content comprising one or more video segments, each of the one or more video segments comprising one or more video frames, the system comprising: a RAP module configured for identifying one or more random access points in the video content on a first thread of execution, wherein each of the one or more random access points corresponds to a first video frame of one of the one or more video segments, and wherein the video content is of any video format; a work unit creation module configured for creating one or more work units on the first thread of execution based on the identified one or more random access points, wherein each of the one or more created work units corresponds to the one or more video segments; a processing module configured for: processing the one or more created work units by one or more processing units on one or more threads of execution, wherein each of the one or more created work units is automatically assigned to a free processing unit of the one or more processing units, and wherein each of the one or more threads executes concurrently with respect to each other and the first thread; and determining one or more errors in each of the one or more work units during the processing of the one or more work units, wherein each of the one or more errors is represented by its corresponding state information that comprises at least one of a type and description of error, a work unit identifier, a start location, and an end location; a merging module configured for merging the determined one or more errors in each of processed one or more work units with each other based on at least the state information of each of the one or more errors; and a report generation module configured for generating a verification report based on the merging.

14. The system of claim 13 further comprising a communication unit for receiving the video content, wherein the communication unit is further configured to receive a media content, wherein the media content represents at least the video content and an audio content.

15. The system of claim 13, wherein the RAP module is further configured to determine a format of the video content by parsing the video content.

16. The system of claim 13, wherein the RAP module is further configured to obtain one or more details corresponding to each of the one or more video segments in the video content, wherein the one or more details correspond to a start time code, a starting picture number, a start content offset, or a end time code.

17. The system of claim 13, wherein the report generation module is further configured to incrementally report the determined one or more errors in each of the processed one or more work units.

18. A system for performing a content verification in a media content, wherein the media content is either a fixed size media content or a dynamically generated media content, the system comprising: a communication unit configured for receiving the media content on a first thread of execution, wherein the media content comprises at least a video content and an audio content that at least partially correspond to the video content, and wherein the video content comprises one or more video segments, and wherein each of the one or more video segments comprising one or more video frames; a demultiplexing module configured for demultiplexing the media content into the video content and the audio content on the first thread of execution; a loading module configured for loading the video content and the audio content into a video buffer and an audio buffer respectively, wherein the loading occurs continuously until the video buffer and the audio buffer are full, or the video content and the audio content is over, and on the first thread of execution; an audio processing module configured for processing the audio content by at least one processing unit on a second thread of execution, wherein the at least one processing unit reads the audio content from the audio buffer; a RAP module configured for identifying one or more random access points in the video content on a third thread of execution, wherein each of the one or more random access points corresponds to a first video frame of one of the one or more video segments, and wherein the video content comprises any video format; a work unit creation module configured for creating one or more work units on the third thread of execution based on the identified one or more random access points, wherein each of the one or more created work units corresponds to the one or more video segments; a video processing module configured for: processing the one or more created work units by one or more processing units on one or more threads of execution, wherein each of the one or more created work units is automatically assigned to a free processing unit of the one or more processing units, and wherein each of the one or more threads executes concurrently with respect to each other, the first thread, the second thread, and the third thread; and determining one or more errors in each of the one or more work units during the processing of the one or more work units, wherein the determination of the one or more errors in one of the one or more work units is facilitated by analyzing at least the one or more video frames in the one of the one or more work units, and the one or more video frames in a succeeding work unit of the one of the one or more work units, and wherein each of the one or more errors is represented by its corresponding state information that comprises at least one of a type and description of error, a work unit identifier, a start location, and an end location; a merging module configured for merging the determined one or more errors in each of processed one or more work units with each other based on at least the state information of each of the one or more errors, wherein the merging further comprises combining the one or more errors beginning at one of one or more video frames of one of the processed one or more work units with the one or more errors continuing at least at a first video frame of one or more video frames of a succeeding work unit of the one of the processed one or more work units; and a report generation module configured for generating a verification report based on the merging.

* * * * *